United States Patent
Shiohara

(10) Patent No.: US 8,083,631 B2
(45) Date of Patent: Dec. 27, 2011

(54) PLANETARY GEAR TYPE GEARBOX

(75) Inventor: Masaki Shiohara, Komatsu (JP)

(73) Assignee: Komatsu Ltd., Tokyo (JP)

( * ) Notice: Subject to any disclaimer, the term of this patent is extended or adjusted under 35 U.S.C. 154(b) by 220 days.

(21) Appl. No.: 12/668,775

(22) PCT Filed: Aug. 27, 2008

(86) PCT No.: PCT/JP2008/065314
§ 371 (c)(1),
(2), (4) Date: Jan. 12, 2010

(87) PCT Pub. No.: WO2009/041209
PCT Pub. Date: Apr. 2, 2009

(65) Prior Publication Data
US 2010/0184554 A1 Jul. 22, 2010

(30) Foreign Application Priority Data
Sep. 25, 2007 (JP) .................. 2007-246655

(51) Int. Cl.
*F16H 3/62* (2006.01)

(52) U.S. Cl. ....................... 475/282; 475/288

(58) Field of Classification Search .................. 475/288, 475/282, 296
See application file for complete search history.

(56) References Cited

U.S. PATENT DOCUMENTS

| 4,004,473 | A | 1/1977 | Pearce et al. | |
|---|---|---|---|---|
| 4,205,563 | A | 6/1980 | Gorrell | |
| 5,049,116 | A | 9/1991 | Asada | |
| 5,823,910 | A | 10/1998 | Park | |
| 7,682,282 | B2 * | 3/2010 | Kamm et al. | 475/277 |
| 7,811,197 | B2 * | 10/2010 | Phillips et al. | 475/275 |
| 7,867,130 | B2 * | 1/2011 | Carey et al. | 475/277 |
| 7,887,457 | B2 * | 2/2011 | Wittkopp et al. | 475/277 |

FOREIGN PATENT DOCUMENTS

| DE | 10 2004 023 956 A1 | 12/2005 |
|---|---|---|
| JP | 50-84751 | 7/1975 |
| JP | 02-154841 A | 6/1990 |
| JP | 05-60190 A | 3/1993 |
| JP | 09-291989 A | 11/1997 |

* cited by examiner

*Primary Examiner* — Sherry Estremsky
(74) *Attorney, Agent, or Firm* — Global IP Counselors

(57) ABSTRACT

A planetary gear type gearbox includes a front-stage transmission section and rear-stage transmission section. The front-stage transmission section is for transmitting power from an input shaft to an intermediate shaft. The front-stage transmission section includes first, second and third clutches, two sets of planetary gear trains axially adjoining to each other. The first planetary gear train includes a sun gear, a carrier, a ring gear and planet gears. The second planetary gear train includes a sun gear, a carrier, a ring gear and two sets of planet gears. In the activation of second and third clutches, power is inputted into the carrier from the input shaft and is then outputted from the ring gear of the first planetary gear train.

10 Claims, 5 Drawing Sheets

| SPEED CHANGE STAGE | CLUTCH | | | | | | | REDUCTION RATIO | INTER-STAGE RATIO |
|---|---|---|---|---|---|---|---|---|---|
| | M | H | L | 3RD | 2ND | REV | 1ST | | |
| F1 | | | ○ | | | | ○ | 5.091 | 1.348 |
| F2 | ○ | | | | | | ○ | 3.780 | 1.335 |
| F3 | | ○ | | | | | ○ | 2.830 | 1.308 |
| F4 | | | ○ | | ○ | | | 2.163 | 1.348 |
| F5 | ○ | | | | ○ | | | 1.606 | 1.335 |
| F6 | | ○ | | | ○ | | | 1.203 | 1.203 |
| F7 | | | ○ | ○ | | | | 1.000 | 1.348 |
| F8 | ○ | | | ○ | | | | 0.742 | 1.335 |
| F9 | | ○ | | ○ | | | | 0.556 | |
| R1 | | | ○ | | | ○ | | −4.571 | 1.348 |
| R2 | ○ | | | | | ○ | | −3.394 | 1.335 |
| R3 | | ○ | | | | ○ | | −2.541 | |

FIG. 4

PLANETARY GEAR TYPE GEARBOX

CROSS-REFERENCE TO RELATED APPLICATIONS

This national phase application claims priority to Japanese Patent Application No. 2007-246655, filed on Sep. 25, 2007. The entire disclosure of Japanese Patent Application No. 2007-246655 is hereby incorporated herein by reference.

TECHNICAL FIELD

The present invention relates to a planetary gear type gearbox, for instance, to be installed in a dump truck.

BACKGROUND ART

A transmission, including a plurality of planetary gear trains, has been recently installed in the construction vehicles such the dump trucks. In the gearbox, engine torque is inputted into an input shaft and a plurality of speed stages are shifted back and forth depending on objects of driving a vehicle.

For example, U.S. Pat. No. 4,205,563 (issued on Jun. 3, 1980) discloses a gearbox in which not only clutches and brakes but also a torque converter and two sets of planetary gear trains are combined. According to the gearbox, a wide range of speed reduction can be realized by setting the inter-stage ratios to be roughly the same. Note the inter-stage ratio is a ratio between speed change ratios of speed-change stages.

DISCLOSURE OF THE INVENTION

The aforementioned conventional gearbox has the following drawback.

In short, the gearbox, disclosed in the aforementioned patent document, has a drawback that a reduction ratio of a speed unit always exceeds "1". For example, as illustrated in FIG. 2 of the aforementioned patent document, the reduction ratio is set to be: 1.00 in engagement of a clutch 28 (L clutch); 1.35 in engagement of a brake 24 (M clutch); and 1.84 in engagement of a brake 26 (H clutch).

With the configuration, large torque is transmitted to the rear stage of the gearbox. In response to this, a variety of countermeasures are required. For example, torque is required to be inhibited by installing a speedup gear in the front-stage side of the gears disposed in the rear stage. Alternatively, the gears to be disposed in the rear stage are required to be formed in a large size in consideration of their durability.

It is an object of the present invention to provide a planetary gear type gearbox for allowing a multi-stage gear train to keep a simple structure by inhibiting output-side torque without addition of an extra component such as a speedup gear or size increase of the gears to be disposed in the rear stage.

A planetary gear type gearbox according to a first aspect of the present invention includes a front-stage transmission section and a rear-stage transmission section. The front-stage transmission section includes an input shaft that power is inputted thereto. The rear-stage transmission section includes an intermediate shaft coupled to the front-stage transmission section and an output shaft for outputting power. The front-stage transmission section includes a first planetary gear train, a second planetary gear train, a first clutch, a second clutch and a third clutch. The first planetary gear train includes a first sun gear, a plurality of first planet gears, a first carrier and a first ring gear. The first planet gears mesh with the first sun gear. The first carrier is coupled to the input shaft, and rotatably supports the first planet gears. The first ring gear is connected to the intermediate shaft, and meshes with the first planet gears. The second planetary gear train includes a second sun gear, a plurality of inner peripheral side second planet gears, a plurality of outer peripheral side second planet gears, a second carrier and a second ring gear. The second sun gear is integrally and rotatably coupled to the first sun gear. The inner peripheral side second planet gears mesh with the second sun gear. The outer peripheral side second planet gears mesh with the inner peripheral side second planet gears. The second carrier is connected to the input shaft, and rotatably supports the inner peripheral side second planet gears and the outer peripheral side second planet gears. The second ring gear meshes with the outer peripheral side second planet gears. The first clutch is configured to selectively couple/uncouple the input shaft and the intermediate shaft. The second clutch is configured to selectively allow/prevent rotation of the second sun gear. The third clutch is configured to selectively allow/prevent rotation of the second ring gear.

The planetary gear type gearbox is installed in the construction vehicles and the like (e.g., dump trucks), for instance. The planetary gear type gearbox includes the first and second planetary gear trains and the first to third clutches for shifting three speed-change stages back and forth. The second planetary gear train is so-called a double planetary type planetary gear train. Additionally, according to the planetary gear type gearbox, power transmissions of the first and second planetary gear trains have a configuration that power is inputted into the first carrier and is outputted from the first ring gear in a speed-change stage in which a reduction ratio is gradually reduced.

According to the configuration, the reduction ratios in the three stages can be all set to be equal to or less than 1.000 by configuring power to be inputted into the carrier and to be outputted from the ring gear in the first planetary gear train.

As a result, it is possible to compactly form the gears and the like on the rear-stage side without increasing their sizes just like the conventional gearboxes that the reduction ratios in three speed-change stages are all equal to or greater than 1.000. Furthermore, with the adoption of the aforementioned structure, it is possible to appropriately set the reduction ratios of three speed-change stages so that the inter-stage ratios among three speed-change stages can be roughly the same. As a result, it is possible to compactly form a multi-stage gearbox for providing nine forward stages and three reverse stages, for instance, by disposing the planetary gear type gearbox of the present invention in the input stage and disposing the conventional three-train gearbox in the output stage.

A planetary gear type gearbox according to a second aspect of the present invention is the planetary gear type gearbox of the first aspect. In the planetary gear type gearbox, an output side of the second planetary gear train is connected to the intermediate shaft through the first planetary gear train.

According to the present invention, the size of the gearbox can be further reduced.

A planetary gear type gearbox according to a third aspect of the present invention is the planetary gear type gearbox of the first aspect. In the planetary gear type gearbox, the rear-stage transmission section is a transmission for providing three forward stages and one reverse stage. The forward stages include a low-speed stage, a meddle-speed stage and a high-speed stage. The rear-stage transmission section includes a third planetary gear train, a fourth planetary gear train, a fifth planetary gear train, a low-speed clutch, a middle-speed clutch, a high-speed clutch and a reverse clutch. The third planetary gear train includes a third sun gear, a plurality of third planet gears, a third carrier and a third ring gear. The third planet gears mesh with the third sun gear. The third carrier is coupled to the output shaft, and rotatably supports the third planet gears. The third ring gear meshes with the third planet gears. The fourth planetary gear train includes a fourth sun gear, a plurality of fourth planet gears, a fourth carrier and a fourth ring gear. The fourth planet gears mesh with the fourth sun gear. The fourth carrier rotatably supports the fourth planet gears. The fourth ring gear meshes with the fourth planet gears. The fifth planetary gear train includes a fifth sun gear, a plurality of fifth planet gears, a fifth carrier and a fifth ring gear. The fifth planet gears mesh with the fifth sun gear. The fifth carrier rotatably supports the fifth planet gears. The fifth ring gear meshes with the fifth planet gears. The low-speed clutch is configured to selectively allow/prevent rotation of the third ring gear. The middle-speed clutch is configured to selectively allow/prevent rotation of the fourth ring gear. The high-speed clutch is configured to selectively couple/uncouple the intermediate shaft and the fourth carrier, and is also configured to selectively couple/uncouple the intermediate shaft and the fifth carrier. The reverse clutch is configured to selectively allow/prevent rotation of the fifth ring gear.

According to the present invention, the low-speed clutch and the third planetary gear train are disposed in the closest position to the output side (i.e., the final stage) as output-side components of the gearbox, compared to the reverse clutch and the fifth planetary gear train that correspond to the reverse speed-change stage.

When the reverse speed-change stage is normally disposed in the final stage side, power is inputted through a plurality of planetary gear trains. Therefore, a reduction ratio is increased and traction force thereby tends to be excessively increased.

According to the present invention, however, such a configuration can be avoided that a reduction ratio of the reverse first-speed stage is greater than that of the forward first-speed stage. As a result, it is possible to produce a gearbox for providing nine forward stages and three reverse stages, while such as case is avoided that a less-usable gearbox is produced due to the reverse first-speed stage having low speed and quite large traction force.

A planetary gear type gearbox according to a fourth aspect of the present invention is the planetary gear type gearbox of the third aspect. In the planetary gear type gearbox, the third sun gear, the fourth sun gear and the fifth sun gear are all coupled to the intermediate shaft.

A planetary gear type gearbox according to a fifth aspect of the present invention is the planetary gear type gearbox of the third aspect. In the planetary gear type gearbox, the fifth planet gear includes a plurality of inner peripheral side fifth planet gears and a plurality of outer peripheral side planet gears. The inner peripheral side fifth planet gears mesh with the fifth sun gear, whereas the outer peripheral side fifth planet gears mesh with the fifth ring gear.

A planetary gear type gearbox according to a sixth aspect of the present invention is the planetary gear type gearbox of the third aspect. In the planetary gear type gearbox, the third ring gear, the fourth carrier and the fifth carrier are integrally and rotatably coupled to each other.

A planetary gear type gearbox according to a seventh aspect of the present invention is the planetary gear type gearbox of the first aspect. In the planetary gear type gearbox, the rear-stage transmission section is a transmission for providing three forward stages and one reverse stage. The forward stages include a low-speed stage, a meddle-speed stage and a high-speed stage. The rear-stage transmission section includes a third planetary gear train, a fourth planetary gear train, a fifth planetary gear train, a low-speed clutch, a middle-speed clutch, a high-speed clutch, and a reverse clutch. The third planetary gear train includes a third sun gear, a plurality of third planet gears, a third carrier, and a third ring gear. The third planet gears mesh with the third sun gear. The third carrier is coupled to the output shaft, and rotatably supports the third planet gears. The third ring gear meshes with the third planet gears. The fourth planetary gear train includes a fourth sun gear, a plurality of fourth planet gears, a fourth carrier, and a fourth ring gear. The fourth planet gears mesh with the fourth sun gear. The fourth carrier rotatably supports the fourth planet gears. The fourth ring gear meshes with the fourth planet gears. The fifth planetary gear train includes a fifth sun gear, a plurality of fifth planet gears, a fifth carrier and a fifth ring gear. The fifth planet gears mesh with the fifth sun gear. The fifth carrier is coupled to the output shaft, and rotatably supports the fifth planet gears. The fifth ring gear meshes with the fifth planet gears. The low-speed clutch is configured to selectively allow/prevent rotation of the third ring gear. The middle-speed clutch is configured to selectively allow/prevent rotation of the fourth ring gear. The high-speed clutch is configured to selectively couple/uncouple the intermediate shaft and the fourth carrier. The reverse clutch is configured to selectively allow/prevent rotation of the fifth ring gear.

According to the present invention, the reverse clutch and the fifth planetary gear train, which correspond to the reverse speed-change stage, are disposed in the closest position to the rear-stage side as output-side components of the gearbox.

With the structure, it is possible to produce a gearbox for providing nine forward stages and three reverse stages while quite large traction force is achieved in the reverse first-speed stage by increasing a reduction ratio of the reverse first-speed stage.

A planetary gear type gearbox according to an eighth aspect of the present invention is the planetary gear type gearbox of the seventh aspect. In the planetary gear type gearbox, the third sun gear and the fourth sun gear are coupled to the intermediate shaft.

A planetary gear type gearbox according to a ninth aspect of the present invention is the planetary gear type gear box of the seventh aspect. In the planetary gear type gearbox, the third ring gear, the fourth carrier, and the fifth sun gear are integrally and rotatatbly coupled to each other.

BRIEF EXPLANATION OF THE DRAWINGS

FIG. 4 is a chart for showing a relation between a reduction ratio and an inter-stage ratio for the respective speed-change stages in the transmission of FIG. 1.

DESCRIPTION OF EMBODIMENTS

A configuration of a transmission (planetary gear type gearbox) 1, composed of a front-stage transmission section 10 and a rear-stage transmission section 20, will be hereinafter explained with reference to FIGS. 1 to 4.

Overall Structure of Transmission 1

Figure 1:
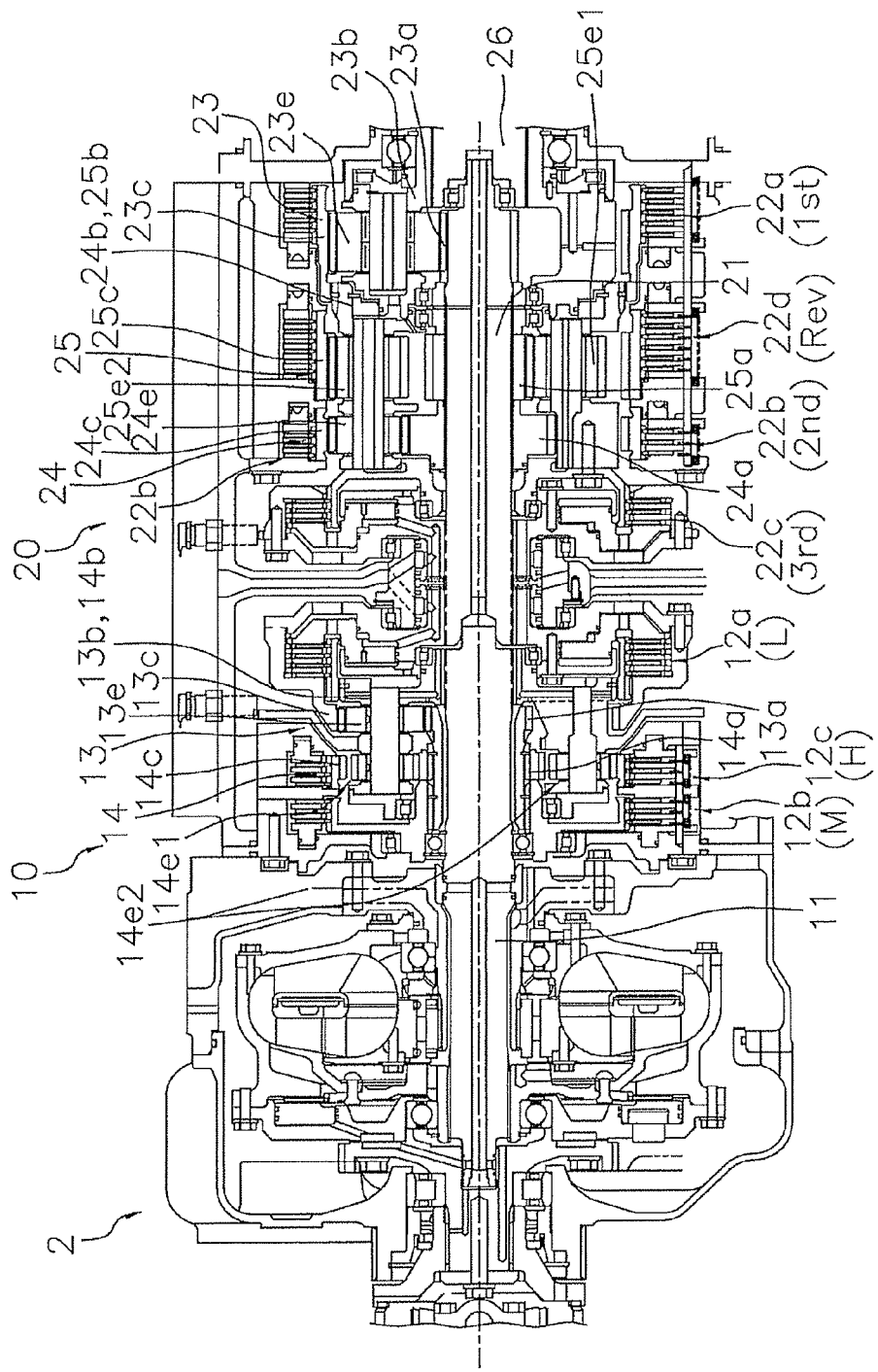
FIG. 1 is a cross-sectional diagram for illustrating a structure of a transmission according to an embodiment of the present invention.
Figure 2:
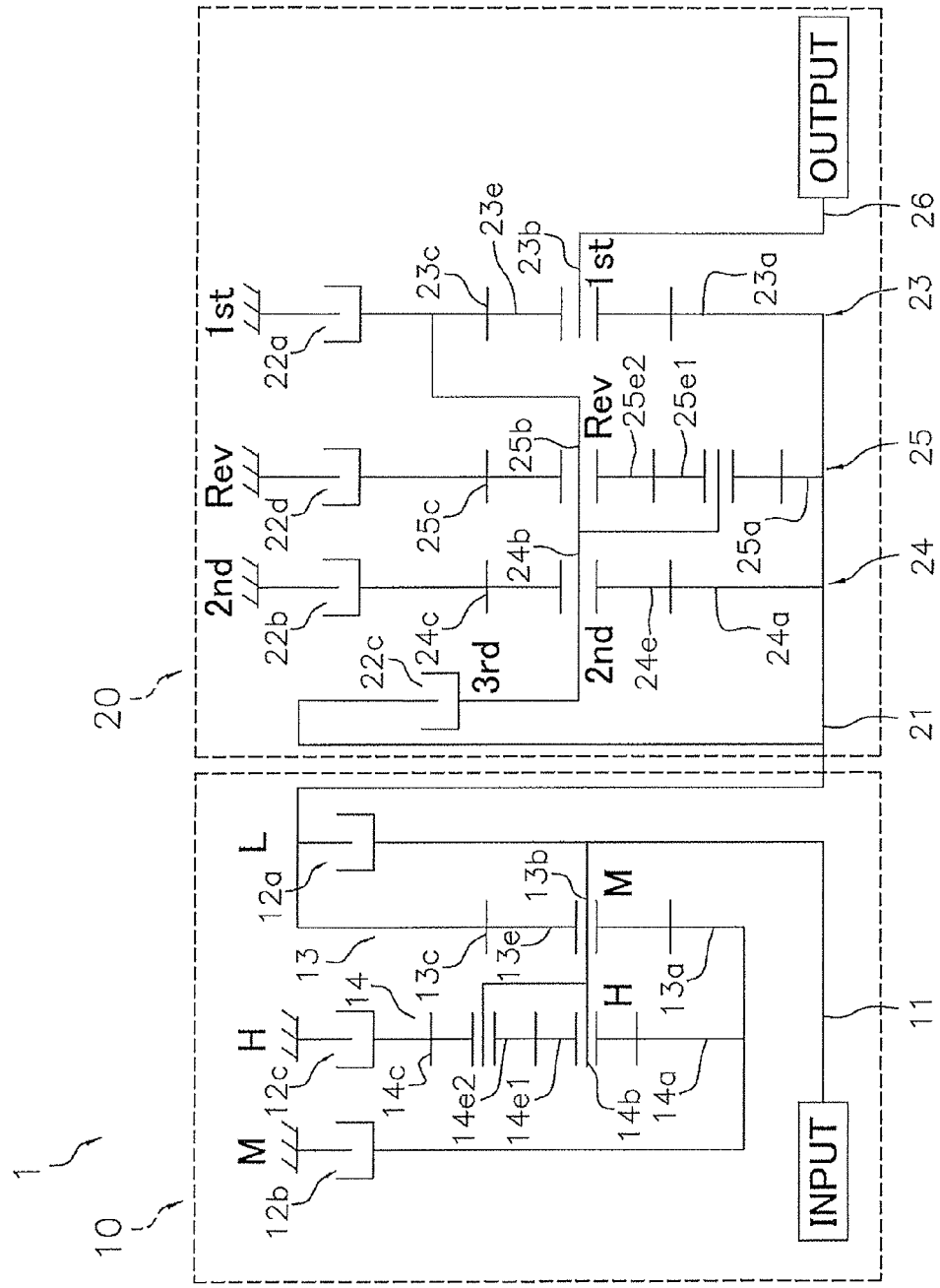
FIG. 2 is a schematic diagram for illustrating the transmission of FIG. 1
Figure 3:
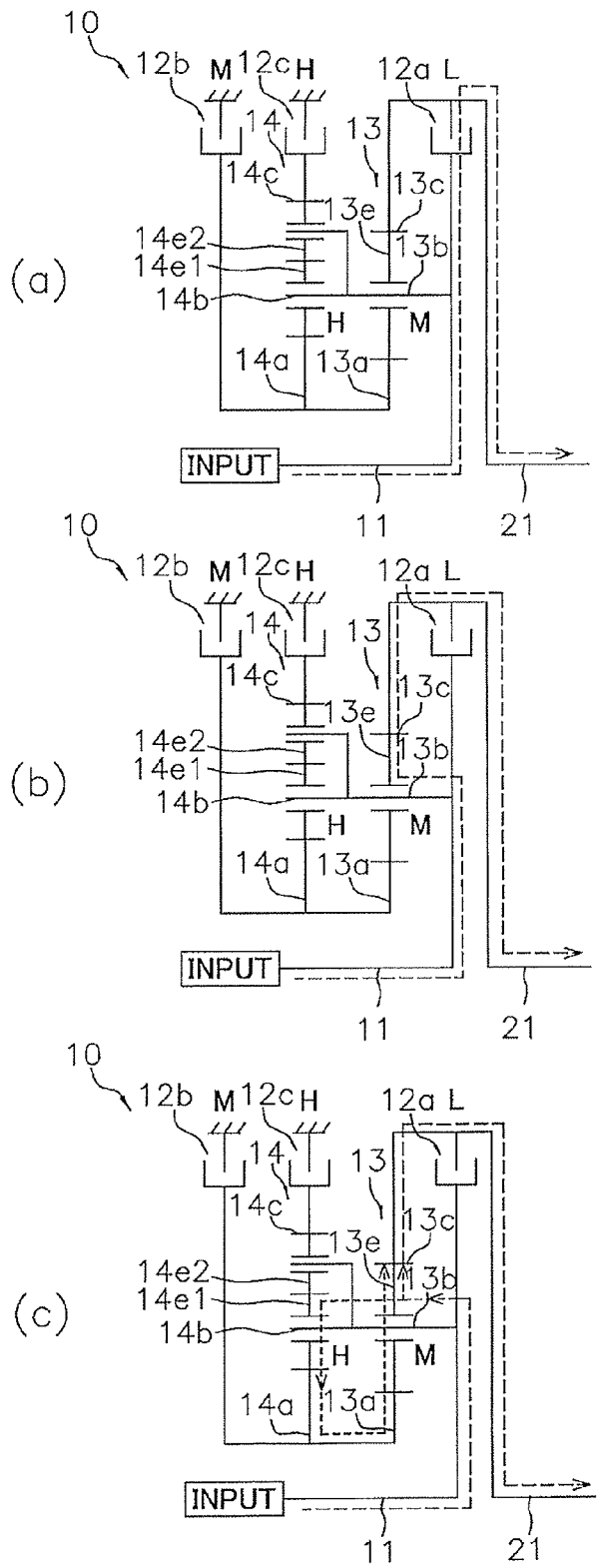
FIGS. 3(a) to 3(c) are schematic diagrams for illustrating power transmission paths with respect to respective speed-change stages in the front-stage transmission section.

As illustrated in FIGS. 1 and 2, the transmission 1 according to the present embodiment includes a torque converter 2, the front-stage transmission section 10 disposed on the rear-stage side of the torque converter 2, and the rear-stage transmission section 20. In the transmission 1, revolution of the torque converter 2 is transmitted to an input shaft 11. Revolution speed of the input shaft 11 is shifted by the front-stage transmission section 10, and the shifted revolution is transmitted to an intermediate shaft 21. Moreover, revolution speed of the intermediate shaft 21 is shafted by the rear-stage transmission section 20, and the shifted revolution is transmitted to an output shaft 26.

Specifically, the transmission 1 includes the front-stage transmission section 10 and the rear-stage transmission section 20. The front-stage transmission section 10 is disposed between the input shaft 11 and the intermediate shaft 21, whereas the rear-stage transmission section 20 is disposed between the intermediate shaft 21 and the output shaft 26. The transmission 1 makes up speed-change stages including nine forward stages (F1 to F9) and three reverse stages (R1 to R3) by the combination of the front-stage transmission section 10 (three stages) and the rear-stage transmission section 20 (three forward stages and one reverse stage) (see FIG. 4).

Front-Stage Transmission Section 10

The front-stage transmission section 10 is mainly composed of the input shaft 11, an L clutch (first clutch) 12a, an M clutch (second clutch) 12b, an H clutch (third clutch) 12c, an M planetary gear train (first planetary gear train) 13 and an H planetary gear train (second planetary gear train) 14. In this case, the M planetary gear train 13 and the H planetary gear train 14 are coaxially disposed to each other. The input shaft 11 is disposed in the most upstream position of a power transmission path in the transmission 1. Power of the torque converter 2 is transmitted to the input shaft 11. The L clutch 12a is disposed in the closest position to the output side in the front-stage transmission section 10. On the other hand, the M clutch 12b is disposed in the closest position to the input side of the front-stage transmission section 10. The H clutch 12c is disposed between the L clutch 12a and the M clutch 12b.

M-Planetary Gear Train 13

The M-planetary gear train 13 is a single planetary type planetary gear train. The M planetary gear train 13 is disposed on the output side in the front-stage transmission section 10. The M-planetary gear train 13 is mainly composed of a sun gear 13a, a carrier 13b, a ring gear 13c and a plurality of planet gears 13e.

The sun gear 13a is disposed on the outer peripheral side of the input shaft 11. The sun gear 13a is also disposed in the most radial inward position of the M planetary gear train 13.

The carrier 13b rotatably supports the planet gears 13e roughly equally spaced apart from each other in the circumferential direction. The respective planet gears 13e mesh with the sun gear 13a. In the present embodiment, the carrier 13b is fixed to the input shaft 11. In the M planetary gear train 13, revolution of the input shaft 11 is configured to be inputted into the carrier 13b.

The ring gear 13c is disposed for meshing with the planet gears 13e whose axes are supported by the carrier 13b. In the present embodiment, the ring gear 13c is fixed with respect to the intermediate shaft 21. Revolution of the M planetary gear train 13 is thus outputted from the ring gear 13c.

H Planetary Gear Train 14

The H planetary gear train 14 is a double planetary type planetary gear train. The H planetary gear train 14 is disposed in a closer position to the input side in the front-stage transmission section 10 than the M planetary gear train 13 is. The H planetary gear train 14 is mainly composed of a sun gear 14a, a carrier 14b, a ring gear 14c, a plurality of inner peripheral side planet gears 14e1, and a plurality of outer peripheral side planet gears 14e2. In other words, the H planetary gear train 14 includes two groups of planet gears.

The sun gear 14a is disposed on the outer peripheral side of the input shaft 11. The sun gear 14a is also disposed in the most radial inward position of the H planetary gear train 14. Additionally, the sun gear 14a of the H planetary gear train 14 is configured to integrally rotate with the sun gear 13a of the M planetary gear train 13.

The carrier 14b rotatably supports the inner peripheral side planet gears 14e1 roughly equally spaced apart from each other in the circumferential direction and the outer peripheral side planet gears 14e2 roughly equally spaced apart from each other in the circumferential direction. The inner peripheral side planet gears 14e1 of the inner and outer peripheral side planet gears 14e1, 14e2 herein mesh with the sun gear 14a. In the present embodiment, the carrier 14b adjoins the carrier 13b included in the M planetary gear train 13 in the axial direction of the input shaft 11. The carrier 14b is also integrated with the carrier 13b. Therefore, revolution of the input shaft 11 can be inputted into the carrier 14b in the H planetary gear train 14, too.

The ring gear 14c is disposed for meshing with the outer peripheral side planet gears 14e1 of the planet gears 14e1, 14e2 whose axes are supported by the carrier 14b.

As described above, the inner peripheral side planet gears 14e1 mesh with the sun gear 14a whereas the outer peripheral side planet gears 14c2 mesh with the ring gear 14c. Additionally, the inner peripheral side planet gears 14e1 and the outer peripheral side planet gears 14e2 mesh with each other. In other words, each of the inner peripheral side planet gears 14e1 meshes with the sun gear 14a and one of the outer peripheral side planet gears 14e2. On the other hand, each of the outer peripheral planet gears 14e2 meshes with the ring gear 14c and one of the inner peripheral side planet gears 14e1.

As described above, the H planetary gear train 14 is a double planetary type planetary gear train composed of two groups of the planet gears 14e1, 14e2. With the configuration, the output rotational direction can be reversed.

Clutch and Power Transmission Path

The L clutch 12a is configured to directly connect the input shaft 11 and the intermediate shaft 21. As illustrated in FIG. 3(a), power is thereby directly transmitted to the intermediate shaft 21 from the input shaft 11 via the L clutch 12a in the activation (i.e., clutch connection) of the L clutch 12a. In this case, the reduction ratio is set to be 1.000.

The M clutch 12b selectively joins the sun gear 13a of the M planetary gear train 13 and a casing (fixation part) of the front-stage transmission section 10. As illustrated in FIG. 3(b), after inputted into the carrier 13b of the M planetary gear train 13 connected to the input shaft 11, power is transmitted to the intermediate shaft 21 from the ring gear 13c through the planet gears 13e whose axes are supported by the carrier 13b in the activation (i.e., clutch connection) of the M clutch 12b. In other words, power is inputted into the carrier 13b and is then outputted from the ring gear 13c. With the configuration, the reduction ratio will be 0.742 in the activation of the M clutch 12b. The reduction ratio 0.742 is less than that in the activation of the L clutch 12a (L-M inter-stage ratio is 1.348).

The H clutch 12c selectively joins the ring gear 14c of the H planetary gear train 14 and the casing (fixation part) of the front-stage transmission section 10. As illustrated in FIG. 3(c), after inputted into the carrier 13b of the M planetary gear train 13 connected to the input shaft 11, power is partially transmitted to the intermediate shaft 21 from the ring gear 13c of the M planetary gear train 13 without any changes in the activation (clutch connection) of the H clutch 12c. On the other hand, rest of the power inputted into the carrier 13b is transmitted to the sun gear 14a of the H planetary gear train 14 via the carrier 14b of the H planetary gear train 14 integrated with the carrier 13b of the M planetary gear train 13. Then, the power is transmitted to the sun gear 13a of the M planetary gear train 13. Subsequently, the power is transmitted to the intermediate shaft 21 from the ring gear 13c of the M planetary gear train 13.

In the activation of the H clutch 12c as described above, after inputted into the carrier 13b of the M planetary gear train 13, power is outputted from the ring gear 13c via the carrier 14b and the sun gear 14a of the H planetary gear train 14 and the sun gear 13a of the M planetary gear train 13 sequentially. Accordingly, the reduction ratio is set to be 0.556, which is less than that in the activation of the M clutch (M-H inter-stage ratio is 1.335).

Rear-Stage Transmission Section 20

The rear-stage transmission section 20 includes the intermediate shaft 21, a first-speed clutch (low-speed clutch) 22a, a second-speed clutch (middle-speed clutch) 22b, a third-speed clutch (high-speed clutch) 22c, a reverse clutch 22d, a first-speed planetary gear train (third planetary gear train) 23, a second-speed planetary gear train (fourth planetary gear train) 24, a reverse planetary gear train (fifth planetary gear train) 25 and the output shaft 26.

The intermediate shaft 21 is interposed between the input shaft 11 and the output shaft 26. The intermediate shaft 21 transmits power, outputted from the front-stage transmission section 10, to the rear-stage transmission section 20. The first-speed clutch 22a is disposed in the closest position to the output side in the rear-stage transmission section 20. The second-speed clutch 22b is disposed between the third-speed clutch 22c and the reverse clutch 22d. The third-speed clutch 22c is disposed in the closest position to the input side in the rear-stage transmission section 20. The reverse clutch 22d is disposed between the first-speed clutch 22a and the second-speed clutch 22b. The output shaft 26 is disposed in the most downstream position of the power transmission path in the transmission 1. The output shaft 26 outputs power, transmitted thereto from the input shaft 11 via the intermediate shaft 21, to the downstream.

First-Speed Planetary Gear Train 23

The first-speed planetary gear train (third planetary gear train) 23 is a single planetary type planetary gear train. The first-speed planetary gear train 23 is disposed in the closest position to the output side in the rear-stage transmission section 20. The first-speed planetary gear train 23 is mainly composed of a sun gear 23a, a carrier 23b, a ring gear 23c and a plurality of planet gears 23e.

The sun gear 23a is disposed on the outer peripheral side of the intermediate shaft 21. The sun gear 23a is also disposed in the most radial inward position of the first-speed planetary gear train 23.

The carrier 23b rotatably supports the planet gears 23e roughly equally spaced apart from each other in the circumferential direction. The respective planet gears 23e mesh with the sun gear 23a. In the present embodiment, the carrier 23b is fixed to the output shaft 26. With the structure, power of the rear-stage transmission section 20 is outputted to the output shaft 26 from the carrier 23b.

The ring gear 23c meshes with the planet gears 23e whose axes are supported by the carrier 23b.

Second-Speed Planetary Gear Train 24

The second-speed planetary gear train (fourth planetary gear train) 24 is a single planetary type planetary gear train. The second-speed planetary gear train 24 is disposed in the closest position to the input side of the rear-stage transmission section 20. The second-speed planetary gear train 24 is mainly composed of a sun gear 24a, a carrier 24b, a ring gear 24c and a plurality of planet gears 24e.

The sun gear 24a is disposed on the outer peripheral side of the intermediate shaft 21. The sun gear 24a is also disposed in the most radial inward position of the second-speed planetary gear train 24.

The carrier 24b rotatably supports the planet gears 24e roughly equally spaced apart from each other in the circumferential direction. The respective planet gears 24e mesh the sun gear 24a. In the present embodiment, the carrier 24b adjoins a carrier 25b of the reverse planetary gear train 25 in the axial direction. The carrier 24b is also integrated with the carrier 25b.

The ring gear 24c meshes with the planet gears 24e whose axes are supported by the carrier 24b.

Reverse Planetary Gear Train 25

The reverse planetary gear train (fifth planetary gear train) 25 is a double planetary type planetary gear train. The reverse planetary gear train 25 is interposed between the first-speed planetary gear train 23 and the second-speed planetary gear train 24 in the rear-stage transmission section 20. The reverse gear train 25 is mainly composed of a sun gear 25a, the carrier 25b, a ring gear 25c, a plurality of inner peripheral side planet gears 25e1 and a plurality of outer peripheral side planet gears 25e2.

The sun gear 25a is disposed on the outer peripheral side of the intermediate shaft 21. The sun gear 25a is also disposed in the most radial inward position of the reverse planetary gear train 25.

The carrier 25b rotatably supports the inner peripheral side planet gears 25e1 roughly equally spaced apart from each other in the circumferential direction and the outer peripheral side planet gears 25e2 roughly equally spaced apart from each other in the circumferential direction. The respective inner peripheral side planet gears 25e1 mesh with the sun gear 25a. In the present embodiment, the carrier 25b is integrated with and axially adjoins the carrier 24b of the second-speed planetary gear train 24 as described above. Furthermore, the carrier 25b is also integrally and rotatably coupled to the ring gear 23 of the first-speed planetary gear train 23.

The ring gear 25c meshes with the outer peripheral side planet gears 25e2 whose axes are supported by the carrier 25b.

As described above, the inner peripheral side planet gears 25e1 mesh with the sun gear 25a whereas the outer peripheral side planet gears 25e2 mesh with the ring gear 25c. Furthermore, the inner peripheral side planet gears 25e1 and the outer peripheral side planet gears 25e2 mesh with each other. In other words, each of the inner peripheral side planet gears 25e1 meshes with the sun gear 25a and one of the outer peripheral side planet gears 25e2. On the other hand, each of the outer peripheral side planet gears 25e2 meshes with the ring gear 25c and one of the inner peripheral side planet gears 25e1.

As described above, the reverse planetary gear train 25 is a double planetary type planetary gear train composed of two groups of the planet gears 25e1, 25e2. With the structure, power for reversely moving the vehicle can be transmitted by reversing the output rotational direction.

Clutch and Power Transmission Path

The first-speed clutch 22a selectively joins the ring gear 23c of the first-speed planetary gear train 23 and a casing (fixation part) of the rear-stage transmission section 20. In the activation (clutch connection) of the first-speed clutch 22a, power is transmitted to the carrier 23b from the sun gear 23a of the first-speed planetary gear train 23 connected to the intermediate shaft 21 via the planet gears 23e. The power, transmitted to the carrier 23b, is then transmitted to the output shaft 26. Note in the activation of the first-speed clutch 22a, forward first to third speed change stages (F1 to F3) can be achieved by the combination of the aforementioned activations of the L, M and H clutches 12a, 12b and 12c. FIG. 4 illustrates example speed change ratios of the case. Specifically, the speed change ratios of F1, F2 and F3 can be set to 5.091, 3.780 and 2.830, respectively. As shown in FIG. 4, the inter-stage ratio F1/F2 is herein 1.348 whereas the inter-stage ratio F2/F3 is 1.335.

The second-speed clutch 22b selectively joins the ring gear 24c of the second-speed planetary gear train 24 to the casing (fixation part) of the rear-stage transmission section 20. In the activation (i.e., clutch connection) of the second-speed clutch 22b, the power inputted into the intermediate shaft 21 is partially transmitted from the sun gear 24a of the second-speed planetary gear train 24 to the carrier 25b integrated with the carrier 24b via the planet gears 24e. Then the partially transmitted power is transmitted to the carrier 23b of the first-speed planetary gear train 23 via the ring gear 23c and the planet gears 23e. Finally, the partially transmitted power is transmitted to the output shaft 26. Simultaneously, the rest of power is transmitted from the sun gear 23a of the first-speed planetary gear train 23 to the carrier 23b via the planet gears 23e. Thus transmitted power is then transmitted to the output shaft 26.

In the activation of the second-speed clutch 22b, forward fourth to sixth speed change stages (F4 to F6) can be achieved by the combination of the aforementioned activations of the L, M and H clutches 12a, 12b and 12c. FIG. 4 shows example speed change ratios of the case. Specifically, the speed change ratios of F4, F5 and F6 can be set to be 2.163, 1.606 and 1.203, respectively. As shown in FIG. 4, the inter-stage ratios F3/F4, F4/F5 and F5/F6 are herein 1.308, 1.348 and 1.335, respectively.

The third-speed clutch 22c selectively joins the intermediate shaft 21 and the carrier 24b of the second-speed planetary gear train 24. In the activation (i.e., clutch connection) of the third-speed clutch 22c, power inputted into the intermediate shaft 21 is partially transmitted from the carrier 25b integrated with the carrier 24b of the second-speed planetary gear train 24 to the carrier 23b of the first-speed planetary gear train 23 via the ring gear 23c and the planet gears 23e. The partially transmitted power is then transmitted to the output shaft 26. Simultaneously, the rest of power is transmitted from the sun gear 23a of the first-speed planetary gear train 23 to the carrier 23b via the planet gears 23e. Thus transmitted power is then transmitted to the output shaft 26.

In the activation of the third-speed clutch 22c, forward seventh to ninth speed change stages (F7 to F9) can be achieved by the combination of the aforementioned L, M and H clutches 12a, 12b and 12c. FIG. 4 shows example speed change ratios of the case. Specifically, the speed change ratios of F7, F8 and F9 can be set to be 1.000, 0.742 and 0.556, respectively. As shown in FIG. 4, the inter-stage ratios F6/F7, F7/F8 and F8/F9 are herein 1.203, 1.348 and 1.335, respectively.

The reverse clutch 22d selectively joins the ring gear 25c of the reverse planetary gear train 25 and the casing (fixation part) of the rear-stage transmission section 20. In the activation (i.e., clutch connection) of the reverse clutch 22d, power inputted into the intermediate shaft 21 is transmitted from the sun gear 25a of the reverse planetary gear train 25 to the carrier 25b via the planet gears 25e. The power is then transmitted to the carrier 23b of the first-speed planetary gear train 23 via the ring gear 23c and the planet gears 23e. Thus transmitted power is then transmitted to the output shaft 26. In the activation of the reverse clutch 22d, reverse first to third speed change stages (R1 to R3) can be achieved by the combination of the aforementioned activations of the L, M and H clutches 12a, 12b and 12c. FIG. 4 shows example speed change ratios of the case. Specifically, the speed change ratios of R1, R2 and R3 can be set to be −4.571, −3.394 and −2.541, respectively. As shown in FIG. 4, the inter-stage ratio R1/R2 is herein 1.348 whereas the inter-stage ratio R2/R3 is 1.335.

Characteristics of Transmission 1 and Front-Stage Transmission Section 10

(1) In the front-stage transmission section 10 of the present embodiment, both of the carrier 13b of the M planetary gear train 13 and the carrier 14b of the H planetary gear train 14 are connected to the input shaft 11. Additionally, the ring gear 13c of the M planetary gear train 13 is connected to the intermediate shaft 21.

With the structure, it is possible to achieve a configuration that power is inputted into the carrier 13b from the input shaft 11 and the inputted power is outputted from the ring gear 13e in the activation of the M and H clutches 12b, 12c. Therefore, the reduction ratios can be all set to be equal to or less than 1.000 with the combination of the aforementioned two planetary gear trains in the activations of the L, M and H clutches 12a, 12b and 12c. Consequently, the large amount of torque is not transmitted to the intermediate shaft 21 on the output side, and the structure of the transmission 1 can be simplified.

Furthermore, the inter-stage ratios among H, M and L can be roughly the same using the structures of the M and H planetary gear trains 13, 14 and the relation between input power and output power, as described above. Accordingly, the speed change stages, composed of nine forward stages and three reverse stages, can be easily provided by the combination of the M and H planetary gear trains 13, 14 and the rear-stage transmission section 20 that is disposed on the rear-stage side and includes three forward stages and one reverse stage.

(2) In the transmission 1 of the present embodiment, the rear-stage transmission section 20 is disposed on the output side of the aforementioned front-stage transmission section 10, as illustrated in FIGS. 1 and 2. The rear-stage transmission section 20 includes a clutch mechanism having the first-speed, second-speed, third-speed and reverse clutches 22a, 22b, 22c and 22d, and the first-speed, the second-speed and reverse planetary gear trains 23, 24 and 25.

With the structure, the inter-stage ratios among three speed change stages (L, M and H) can be set to be roughly the same in the front-stage transmission section 10. Consequently, it is possible to easily form the multi-stage (i.e., nine forward stages and three reverse stages) transmission 1 with equal inter-stage ratios in a compact size only by combining the front-stage transmission section 10 with the rear-stage transmissions section 20 that provides three forward stages and one reverse stage.

(3) In the transmission 1 of the present embodiment, the reverse clutch 22d and the reverse planetary gear train 25 are disposed closer to the input side than the first-speed clutch 22a and the first-speed planetary gear train 23 are. It is possible to prevent the reduction ratios of the speed change stages from having unduly large values in the reverse travel of the vehicle, compared to a transmission having a structure that the reverse clutch and the like are disposed in the closest position to the output side. Consequently, the travel speed and the travel torque can be appropriately set when the vehicle reversely travels.

Other Embodiments

As described above, an embodiment of the present invention has been explained. However, the present invention is not limited to the aforementioned embodiment. A variety of changes are possible without departing from the scope of the present invention.

(A) In the aforementioned embodiment, a configuration has been exemplified that the third speed clutch 22c, a collection of the second-speed clutch 22b and the second-speed planetary gear train 24, a collection of the reverse clutch 22d and the reverse planetary gear train 25, and a collection of the first-speed clutch 22a and the first-speed planetary gear train 23 are disposed in this sequential order from the front-stage side as components forming the rear-stage transmission section 20 disposed on the rear side of the front-stage transmission section 10. However, the present invention is not limited to the configuration.

In short, a transmission section, having other configuration, may be combined with the front-stage transmission section 10 as the rear-stage transmission section.

Figure 5:
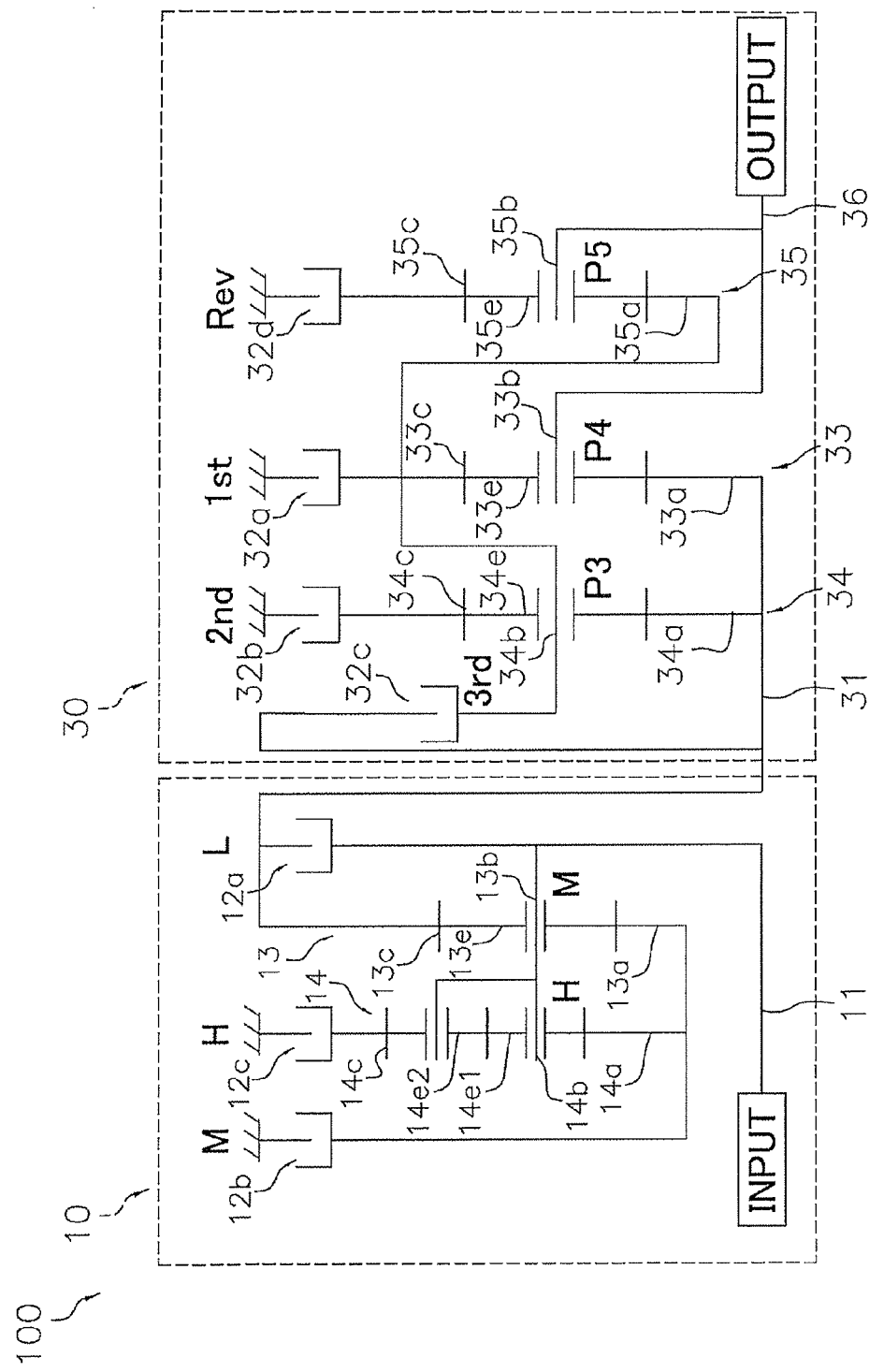
FIG. 5 is a schematic diagram for illustrating a configuration of a transmission according to another embodiment of the present invention.

For example, a transmission of the present invention may be a transmission 100 illustrated in FIG. 5. The transmission 100 is configured to transmit power from an intermediate shaft 31 to an output shaft 36. The transmission 100 includes a rear-stage transmission section 30. The rear-stage transmission section 30 has a configuration that a third-speed clutch 32c, a collection of a second-speed clutch 32b and a second-speed planetary gear train 34, a collection of a first-speed clutch 32a and a first-speed planetary gear train 33, and a collection of a reverse clutch 32d and a reverse planetary gear train 35 are sequentially disposed in this order from the front-stage side.

In the transmission 100 illustrated in FIG. 5, the first-speed planetary gear train 33 is selectively joined to the first clutch 32a. The first-speed planetary gear train 33 includes a sun gear 33a, a carrier 33b, a plurality of planet gears 33e rotatably supported by the carrier 33b, and a ring gear 33c.

On the other hand, the second-speed planetary gear train 34 is selectively joined to the second clutch 32b. The second-speed planetary gear train 34 includes a sun gear 34a, a carrier 34b, a plurality of planet gears 34e rotatably supported by the carrier 34b, and a ring gear 34c.

Further, the reverse planetary gear train 35 is selectively joined to the reverse clutch 32d. The reverse planetary gear train 35 includes a sun gear 35a, a carrier 35b, a plurality of planet gears 35e rotatably supported by the carrier 35b, and a ring gear 35c.

Furthermore, the ring gear 33c, the carrier 34b and the sun gear 35a are coupled to the intermediate shaft 31 through the third-speed clutch 32c. On the other hand, the sun gears 33a, 34a are integrally and rotatably coupled to each other. The carriers 33b, 35b are coupled to the output shaft 36.

Further, the first-speed clutch 32a couples/uncouples the ring gear 33c from a casing (fixation part). The second-speed clutch 32b couples/uncouples the ring gear 34c from the casing (fixation part). The third-speed clutch 32c couples the intermediate shaft 31 to the carrier 34b. The reverse clutch 32d couples the ring gear 35c to the case (fixation part).

In this case, the reverse planetary gear train 35 and the like are positioned in the closest position to the rear-stage side. It is thereby possible to sufficiently ensure traction force by substantially increasing the reduction ratio of the reverse first-speed stage. As a result, the present example embodiment can be applied to a type of vehicle that requires traction force in the reverse traveling.

(B) In the aforementioned embodiment, the setting has been exemplified that the H, M and L reduction ratios of the front-stage transmission section 10 are set to be 0.556, 0.742 and 1.000, respectively. However, the present invention is not limited to this.

For example, the reduction ratios can be set to be greater/less than the above values as long as the inter-stage ratios H/M and M/L can be roughly the same based on the reduction ratios.

(C) In the aforementioned embodiment, a configuration has been exemplified that the rear-stage transmission section 20 provides three forward stages and one reverse stage. However, the present invention is not limited to this.

For example, a further multi-stage transmission section, providing four forward stages and one reverse stage, may be combined with the front-stage transmission section as the rear-stage transmission section. In this case, it is possible to obtain a further multi-stage gearbox that provides 12 forward stages and three reverse stages as a whole.

(D) In the aforementioned embodiment, the transmission 1 of the present invention has been explained with an example case that it is installed in a dump truck. However, application of the present invention is not limited to this.

For example, the transmission 1 may be installed in a construction vehicle such as a wheel loader. Alternatively, it may be installed in any other working vehicles.

According to the planetary gear type gearbox of the above embodiments, a multi-stage gear train with a simple structure can be produced by inhibiting torque to be transmitted to a rear-stage transmission section without increasing the size of gears to be disposed in the rear stage or adding an extra component such as a speedup gear. Therefore, the planetary gear type gearbox of the above embodiments can be widely applied to the general vehicles configured to travel while the travel speed or the traction force are changed by shifting a plurality of speed change stages back and forth.

The invention claimed is:

1. A planetary gear type gearbox comprising:
   a front-stage transmission section including an input shaft to which power is inputted; and
   a rear-stage transmission section including an intermediate shaft coupled to the front-stage transmission section and an output shaft for outputting power,
   the front-stage transmission section including
      a first planetary gear train having a first sun gear, a plurality of first planet gears meshing with the first sun gear, a first carrier connected to the input shaft with the first carrier rotatably supporting the first planet gears, and a first ring gear connected to the intermediate shaft with the first ring gear meshing with the first planet gears,
      a second planetary gear train having a second sun gear integrally and rotatably coupled to the first sun gear, a plurality of inner peripheral side second planet gears meshing with the second sun gear, a plurality of outer peripheral side second planet gears meshing with the inner peripheral side second planet gears, a second carrier connected to the input shaft with the second carrier rotatably supporting the inner peripheral side second planet gears and the outer peripheral side second planet gears, and a second ring gear meshing with the outer peripheral side second planet gears,
      a first clutch configured to selectively couple/uncouple the input shaft and the intermediate shaft,
      a second clutch configured to selectively allow/prevent rotation of the second sun gear, and
      a third clutch configured to selectively allow/prevent rotation of the second ring gear.

2. The planetary gear type gearbox according to claim 1, wherein
   an output side of the second planetary gear train is connected to the intermediate shaft through the first planetary gear train.

3. The planetary gear type gearbox according to claim 1, wherein
   a speedup ratio of the second planetary gear train is greater than that of the first planetary gear train.

4. The planetary gear type gearbox according to claim 1, wherein
   the rear-stage transmission section is a transmission for providing three forward stages and one reverse stage, the forward stages including a low-speed stage, a middle-speed stage and a high-speed stage, and
   the rear-stage transmission section including
      a third planetary gear train having a third sun gear, a plurality of third planet gears meshing with the third sun gear, a third carrier coupled to the output shaft with the third carrier rotatably supporting the third planet gears, and a third ring gear meshing with the third planet gears,
      a fourth planetary gear train having a fourth sun gear, a plurality of fourth planet gears meshing with the fourth sun gear, a fourth carrier rotatably supporting the fourth planet gears, and a fourth ring gear meshing with the fourth planet gears,
      a fifth planetary gear train having a fifth sun gear, a plurality of fifth planet gears meshing with the fifth sun gear, a fifth carrier rotatably supporting the fifth planet gears, and a fifth ring gear meshing with the fifth planet gears,
      a low-speed clutch configured to selectively allow/prevent rotation of the third ring gear,
      a middle-speed clutch configured to selectively allow/prevent rotation of the fourth ring gear,
      a high-speed clutch configured to selectively couple/uncouple the intermediate shaft and the fourth carrier and selectively couple/uncouple the intermediate shaft and the fifth carrier, and
      a reverse clutch configured to selectively allow/prevent rotation of the fifth ring gear.

5. The planetary gear type gearbox according to claim 4, wherein
   the third sun gear, the fourth sun gear and the fifth sun gear are all coupled to the intermediate shaft.

6. The planetary gear type gearbox according to claim 4, wherein
   the fifth planet gears includes a plurality of inner peripheral side fifth planet gears and a plurality of outer peripheral side planet gears, the inner peripheral side fifth planet gears meshing with the fifth sun gear, and the outer peripheral side fifth planet gears meshing with the fifth ring gear.

7. The planetary gear type gearbox according to claim 4, wherein
   the third ring gear, the fourth carrier and the fifth carrier are integrally and rotatably coupled to each other.

8. The planetary gear type gearbox according to claim 1, wherein
   the rear-stage transmission section is a transmission for providing three forward stages and one reverse stage, the forward stages including a low-speed stage, a middle-speed stage and a high-speed stage, and
   the rear-stage transmission section including
      a third planetary gear train having a third sun gear, a plurality of third planet gears meshing with the third sun gear, a third carrier coupled to the output shaft with the third carrier rotatably supporting the third planet gears, and a third ring gear meshing with the third planet gears,
      a fourth planetary gear train having a fourth sun gear, a plurality of fourth planet gears meshing with the fourth sun gear, a fourth carrier rotatably supporting the fourth planet gears, and a fourth ring gear meshing with the fourth planet gears,
      a fifth planetary gear train having a fifth sun gear, a plurality of fifth planet gears meshing with the fifth sun gear, a fifth carrier coupled to the output shaft with the fifth carrier rotatably supporting the fifth planet gears, and a fifth ring gear meshing with the fifth planet gears,
      a low-speed clutch configured to selectively allow/prevent rotation of the third ring gear,
      a middle-speed clutch configured to selectively allow/prevent rotation of the fourth ring gear,
      a high-speed clutch configured to selectively couple/uncouple the intermediate shaft and the fourth carrier, and
      a reverse clutch configured to selectively allow/prevent rotation of the fifth ring gear.

9. The planetary gear type gearbox according to claim 8, wherein
   the third sun gear and the fourth sun gear are coupled to the intermediate shaft.

10. The planetary gear type gearbox according to claim 8, wherein
    the third ring gear, the fourth carrier and the fifth sun gear are integrally and rotatably coupled to each other.

* * * * *